(12) United States Patent
Reinprecht et al.

(10) Patent No.: US 12,431,560 B2
(45) Date of Patent: Sep. 30, 2025

(54) BATTERY SYSTEM AND VEHICLE INCLUDING THE BATTERY SYSTEM

(71) Applicant: SAMSUNG SDI CO., LTD., Yongin-si (KR)

(72) Inventors: Wolfgang Reinprecht, Attendorf (AT); Michael Erhart, Seiersberg-Pirka (AT); Gernot Kraberger, Graz (AT); Matthias Pucher, Lebring (AT)

(73) Assignee: Samsung SDI Co., Ltd., Yongin-Si (KR)

( * ) Notice: Subject to any disclaimer, the term of this patent is extended or adjusted under 35 U.S.C. 154(b) by 0 days.

(21) Appl. No.: 17/672,411

(22) Filed: Feb. 15, 2022

(65) Prior Publication Data

US 2022/0263151 A1 Aug. 18, 2022

(30) Foreign Application Priority Data

Feb. 17, 2021 (EP) ..................................... 21157606
Feb. 14, 2022 (KR) ........................ 10-2022-0019079

(51) Int. Cl.
*H01M 10/658* (2014.01)
*H01M 10/653* (2014.01)
(Continued)

(52) U.S. Cl.
CPC ....... *H01M 10/658* (2015.04); *H01M 10/653* (2015.04); *H01M 50/147* (2021.01);
(Continued)

(58) Field of Classification Search
CPC ............. H01M 10/653; H01M 10/658; H01M 2220/20; H01M 50/147; H01M 50/249; H01M 50/3425; H01M 50/505
See application file for complete search history.

(56) References Cited

U.S. PATENT DOCUMENTS

2012/0094155 A1* 4/2012 Lim ..................... H01M 50/308
429/82
2013/0089763 A1 4/2013 Lee
(Continued)

FOREIGN PATENT DOCUMENTS

CN 104659439 A 5/2015
CN 210535737 U 5/2020
(Continued)

OTHER PUBLICATIONS

Extended European Search Report issued in corresponding application No. EP 21157606.1, dated Jul. 20, 2021, 7 pages.
(Continued)

*Primary Examiner* — Lingwen R Zeng
(74) *Attorney, Agent, or Firm* — Womble Bond Dickinson (US) LLP

(57) ABSTRACT

A battery system for an electric vehicle includes: a plurality of battery cells, each of the battery cells including electrode terminals; a busbar interconnecting the battery cells by contacting the electrode terminals; a battery housing enclosing the battery cells; and an electrically and thermally insulating cover element. The cover element covers the electrode terminals and the busbar such that the electrode terminals and the busbar are shielded from venting products exiting one or more of the battery cells towards the battery housing during a thermal runaway.

14 Claims, 3 Drawing Sheets

(51) Int. Cl.
  *H01M 50/147*  (2021.01)
  *H01M 50/342*  (2021.01)
  *H01M 50/505*  (2021.01)
  *H01M 50/249*  (2021.01)

(52) U.S. Cl.
  CPC ..... *H01M 50/3425* (2021.01); *H01M 50/505* (2021.01); *H01M 50/249* (2021.01); *H01M 2220/20* (2013.01)

(56) References Cited

U.S. PATENT DOCUMENTS

| | | | |
|---|---|---|---|
| 2013/0095356 A1* | 4/2013 | Shimizu | H01M 50/519 429/88 |
| 2014/0234677 A1 | 8/2014 | Yoon | |
| 2015/0140367 A1* | 5/2015 | Yagi | H01M 10/6551 429/50 |
| 2021/0296625 A1* | 9/2021 | Li | H01M 50/124 |
| 2022/0262539 A1* | 8/2022 | Huang | H01M 50/282 |

FOREIGN PATENT DOCUMENTS

| | | |
|---|---|---|
| CN | 211088321 U | 7/2020 |
| CN | 211404606 U | 9/2020 |
| KR | 10-2016-0132143 A | 11/2016 |
| WO | WO 2015/086436 A1 | 6/2015 |
| WO | WO 2021/022130 A1 | 2/2021 |

OTHER PUBLICATIONS

Chinese Notification of the First Office Action, for Patent Application No. 202210145411.4, mailed Dec. 29, 2023, 14 pages with English translation.

Korean Office Action for KR Application No. 10-2022-0019079, dated Jun. 20, 2024, 10 pages.

European Office Action issued in corresponding European Patent Application No. 21 157 606.1, dated Aug. 22, 2025, 6 pages.

* cited by examiner

BATTERY SYSTEM AND VEHICLE INCLUDING THE BATTERY SYSTEM

CROSS-REFERENCE TO RELATED APPLICATION

This application claims priority to and the benefit of European Patent Application No. 21157606.1, filed in the European Patent Office on Feb. 17, 2021, and Korean Patent Application No. 10-2022-0019079, filed in the Korean Intellectual Property Office on Feb. 14, 2022, the entire content of both of which are incorporated herein by reference.

BACKGROUND

1. Field

Aspects of embodiments of the present disclosure relate to a battery system and a vehicle including the battery system.

2. Description of the Related Art

Recently, vehicles for transportation of goods and peoples have been developed that use electric power as a source for motion. Such an electric vehicle is an automobile that is propelled by an electric motor using energy stored in rechargeable batteries. An electric vehicle may be solely powered by batteries or be a hybrid vehicle powered at least in part by, for example, a gasoline generator. Furthermore, the vehicle may include a combination of electric motor and conventional combustion engine.

Generally, an electric-vehicle battery (EVB), or traction battery, is a battery used to power the propulsion of battery electric vehicles (BEVs). Electric-vehicle batteries differ from starting, lighting, and ignition batteries in that they are designed to provide power over sustained periods of time. A rechargeable (or secondary) battery differs from a primary battery in that it is designed to be repeatedly charged and discharged, while the latter is designed to provide an irreversible conversion of chemical to electrical energy. Low-capacity rechargeable batteries are used as a power supply for small electronic devices, such as cellular phones, notebook computers, and camcorders, while high-capacity rechargeable batteries are used as the power supply for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, for example cylindrical or rectangular, depends on the battery's intended purpose. Lithium-ion (and similar lithium polymer) batteries, widely known via their use in laptops and consumer electronics, dominate recent electric vehicles in development.

Rechargeable batteries may be used as a battery module formed of a plurality of unit battery cells coupled to each other in series and/or in parallel to provide a high energy density, in particular for motor driving of a hybrid vehicle. For example, the battery module is formed by interconnecting the electrode terminals of the plurality of unit battery cells in an arrangement that depends on a desired amount of power and to realize a high-power rechargeable battery.

Battery modules can be constructed in either block design or modular design. In block designs, each battery is coupled to a common current collector structure and a common battery management system, and the unit thereof is arranged in a housing. In modular designs, pluralities of battery cells are connected to each other to form submodules, and several submodules are connected to each other to form the battery module. In automotive applications, battery systems often consist of a plurality of battery modules connected to each other in series to provide a desired voltage. Therein, the battery modules may include submodules with a plurality of stacked battery cells, and each stack may include cells connected to each other in parallel that are connected to each other in series (XpYs) or multiple cells connected to each other in series that are connected to each other in parallel (XsYp).

A battery pack includes any number of battery modules. Generally, the battery modules are identical. The battery modules may be configured (e.g., may be connected to each other) in a series, parallel, or a mixture of both to deliver the desired voltage, capacity, and/or power density. Components of the battery packs include the individual battery modules and the interconnects, which provide electrical conductivity between them.

Conventional battery systems, despite any modular structure, usually include a battery housing that acts as an enclosure to seal the battery system against the environment and provides structural protection of the battery system's components. Housed battery systems are usually mounted as a whole into their application environment, such as an electric vehicle.

To provide thermal control of the battery cells enclosed within the battery housing, a thermal management system may be used to efficiently emit, discharge, and/or dissipate heat generated within the battery housing. In certain conditions, the battery cells may experience an increase of their internal temperature that can lead to abnormal reactions occurring in the battery cells. An example of such abnormal operation conditions is a thermal runaway in a battery cell, which may occur due to a significantly overheated or overcharged cell. The thermal runaway is a self-accelerating chemical reaction inside the battery cell, which produces high amounts of heat and venting gas, until all available material is exhausted.

Recent venting concepts of a battery let the hot venting gas of a battery cell in thermal runaway condition expand into the battery housing and escape through a housing venting valve to the outside (e.g., the environment of the battery housing).

The exhausted material (e.g., the venting products) may include hot and toxic venting gas as well as conductive solid matter (or material), like graphite powder and metal fragments. The electrically conductive material may deposit on electrically active parts, also called live parts, on top of the cells causing short circuits and arcing. Thus, the thermal runaway of one battery cell could cause short circuits and, thus, consecutive (or sequential) thermal runaway of other battery cells leading to complete damage of the battery (e.g., the battery pack), the battery system, and the vehicle.

The pollution caused by graphite and metallic parts can affect most of the battery cells or battery modules of a battery and may lead to short circuits because all battery cells or modules are within the same battery housing. Depending on the location of the battery cell in thermal runaway with respect to the housing venting valve, different air streams might develop and cause different portions of the battery to be affected.

SUMMARY

It is an object of embodiments the present disclosure to overcome or reduce at least some of the drawbacks of the related art and to provide improved thermal runaway handling, including to provide a battery system better protected against the venting products exhausted during a thermal runaway event.

According an embodiment of the present disclosure, a battery system for a vehicle is provided. The battery system includes a plurality of battery cells and a battery housing enclosing the plurality of battery cells. The battery cells are interconnected with one another via busbars (e.g., first busbars) contacting electrode terminals of the battery cells. Each busbar may connect an electrode terminal of one battery cell to the electrode terminal of another battery cell, such as a neighboring battery cell. The battery cells may be connected to each other in series and/or in parallel. A battery module may be formed by such an interconnection as explained above. Thus, a plurality of battery cells may be interconnected with one another via their electrode terminals and busbars to form a battery module. Also, the battery system may include multiple battery modules, each including multiple battery cells, and neighboring modules are interconnected with one another via busbars (e.g., second busbars) contacting electrode terminals of the battery cells. For example, the battery cells may be arranged in one or more rows to form modules electrically interconnected with one another by the busbars, either within rows and therefore within the modules, or across rows so as to connect the modules. The interconnected cells and/or modules may be spatially separated from each other via crossbeams. The battery modules may form a battery pack as explained above.

According to embodiments of the present disclosure, the battery system may include an electrically and thermally insulating cover element covering the electrode terminals and the busbars so that the electrode terminals and busbars are shielded from venting products exiting one or more of the plurality of battery cells into the battery housing during a thermal runaway. For example, the venting products may exit the cells into a venting channel of the battery housing. The battery system may further include a venting channel for receiving the venting products that exit one or more of the plurality of battery cells during a thermal runaway. The venting channel may be arranged (or formed) between the cover element and a battery cover of the battery housing. Because the cover element covers the electrode terminals and the busbars, the venting products, such as conductive solid material, like graphite powder, and metal fragments, deposit onto the cover element but not directly onto the live parts (e.g., the electrode terminals and the busbars). Because the cover element is electrically and thermally insulating, the operation of the live parts underneath the cover element is not impacted. In addition, the cover element provides mechanical separation between the live parts and the venting products. Thus, arcing, short circuits, and pollution of the cells can be reduced or prevented. Also, the thermal insulation of the cover element shields the cells/modules from the heat of the venting products deposited onto the cover element. Thus, heat transfer to neighboring cells or modules of the vented cell and, therefore, a chain reaction thermal runaway be prevented. This way, the cover element shields the electrode terminals and the busbars from the venting products. The cover element may be arranged to cover further elements of the battery system, such as all the live parts of the battery, which may otherwise be impacted by the venting products.

According to embodiments of the present disclosure, venting products may still be vented into the battery housing during a thermal runaway. Compared to conventional battery systems, however, the venting products do not damage the live parts or the battery system because they do not (directly) deposit onto the cells and live parts but instead deposit onto the cover element.

Compared to the related art venting concepts, a constructively simpler venting concept is provided. The related art concepts proposes a different solution where the venting products are led away from the cells via the guiding channel to prevent any venting products entering the battery housing.

According to an embodiment, the cover element is adapted to the contour of the electrode terminals and busbars. For example, the contour (or form) of the cover element may be adapted to the contour of all the elements it covers, such as the contour of all the live parts it covers. For example, the cover element may be adapted in its three-dimensional shape of the parts that it covers, such as the electrode terminals and the busbars. Such an adaptation of the contours of the cover element and the covered parts leaves less or no access for the venting products to reach the covered parts. This allows for a particularly reliable shielding.

According to an embodiment, the cover element fully covers a venting side of the plurality of battery cells. The venting side is where the electrode terminals and the busbars are provided. Thus, the cover element may not only cover the electrode terminals and busbars but rather the complete venting side of the plurality of battery cells, that is, the side at which the venting products leave the cells in case of a thermal runaway. In this way, not only the electrode terminals and busbars but rather the complete battery cells are separated from the venting channel, which in this case may be delimited by a battery cover on a first side and by the cover element on a second, opposite side. The cover element fully covering the venting side of the cells may therefore reliably prevent pollution of the cells. Also, any further live parts arranged at the venting side may be covered this way and may, thus, be shielded from the venting products. The venting products may deposit onto the whole surface of the plurality of battery cells without any elements underneath taking damage. A thermal separation of the remaining cells may, thus, be achieved so that a thermal propagation of the runaway incident may be prevented and the risk of a burn down of the entire battery system is reduced.

The cover element, however, even when fully covering a venting side of the plurality of battery cells, includes venting openings. According to an embodiment, the venting openings are aligned with venting exits of the battery cells and adapted such that the venting products exiting the battery cells can pass through the venting openings into the venting channel. This allows for the venting of the cells into the battery housing in case of a thermal runaway. The venting openings in the cover element may be aligned to and formed correspondingly to the venting exits of the battery cells. The venting openings in the cover element and/or the venting exits of the battery cells may be in the form of slots. According to an embodiment, the venting openings may be through-holes extending through the cover element. In some embodiments, the cover element may further include venting valves or burst membranes configured to burst under the pressure of the venting products in the venting openings. The cover element having the through-holes is a particularly simple design. Burst membranes may be of the same material as the cover element but at a lower thickness so that the membranes burst as soon as the venting starts. Also, venting valves may be arranged in the cover element and configured to open at a reference (or predetermined) pressure.

According to an embodiment, the cover element can resist temperatures of at least 1000° C. and/or up to 1200° C. For example, the cover element may be configured to withstand temperatures between about 1000° C. and about 1200° C., such as between about 1100° C. and about 1200° C. The cover element, thus, shields the live parts of the cells reliably even when temperatures of the venting products are at 1000° C. or more. If the cover element were not able to resist temperatures of at least 1000° C., the cover element may, under certain circumstances, be damaged due to the hot venting products having temperatures at 1000° C. or even higher. The cover element, configured to withstanding temperatures of up to about 1200° C., however, is sufficient as the temperature of the venting products does in general not exceed this temperature.

According to an embodiment, the cover element may include a composite material with a woven fabric and a matrix support material, such as a resin. The woven fabric may be in the form a mat and may include fibers, such as glass and/or basalt fibers. The woven fabric may, thus, include, for example, a glass fiber mat. The matrix support material, which may be a resin, provides stability to the cover element, including during venting. Due to the composite material, the cover element may, however, be flexible enough to be adapted to the contour of the elements it covers. Thus, the cover element may be adapted to the contour of the electrode terminals and connecting elements. This allows for a particularly reliable shielding.

According to an embodiment, the cover element may include a heat reacting material configured to melt when exposed to the venting products and to subsequently harden to form, in combination with the composite material, a mechanically rigid cover plate. The heat reacting material is a material that reacts to the presence of heat, such as the temperatures occurring during a thermal runaway. According to an embodiment, the heat reacting material includes a glass granulate, such as a gas-filled glass granulate. The glass granulate may be an expanded glass granulate. For example, in one embodiment, the cover element has an arrangement of multiple layers of the composite material and one or more layers of the heat reacting material. Thus, according to an embodiment, the cover element includes at least two layers of the composite material and an intermediate layer of the heat reacting material. The cover element, according to this embodiment, reacts to the venting products in that the heat reacting material melts and combines with the woven fabric, thereby sealing it. The heat reacting material has a melting point lower than a melting point of the woven fabric. The matrix support material of the composite material of the cover element may dissolve during the venting process. The cover element remains dimensionally stable and sealed, however, due to the heat reacting material. Thus, in the case of a thermal runaway, the resin or other matrix support material, and therefore, the cover element, might lose its mechanical stability at temperatures higher than about 200° C., the heat reacting material melts in the higher temperature range under venting stream exposure, thereby keeping the woven fabric, and therefore, the cover element, tightly sealed to ensure the shielding of the remaining cells and live parts. After melting, the heat reacting material hardens and thereby forms, in combination with the composite material, a mechanically rigid, heat resistant cover plate. This cover plate may act as a touch protection element for the battery system.

According to another embodiment of the present disclosure, a vehicle including a battery system as defined above is provided. The battery system may be integrated into an underbody construction of the vehicle, which allows the battery system to have a substantially flat shape. In the case of a thermal runaway, live parts of the battery system are shielded from exhausted venting products, which may include electrically conductive dust. Thereby, an occurrence of short circuits is largely reduced or prevented.

Further aspects and features of the present disclosure can be learned from the dependent claims or the following description.

BRIEF DESCRIPTION OF THE DRAWINGS

Aspects and features of the present disclosure will become apparent to those of ordinary skill in the art by describing, in detail, embodiments thereof with reference to the attached drawings in which.

DETAILED DESCRIPTION

Figure 1:
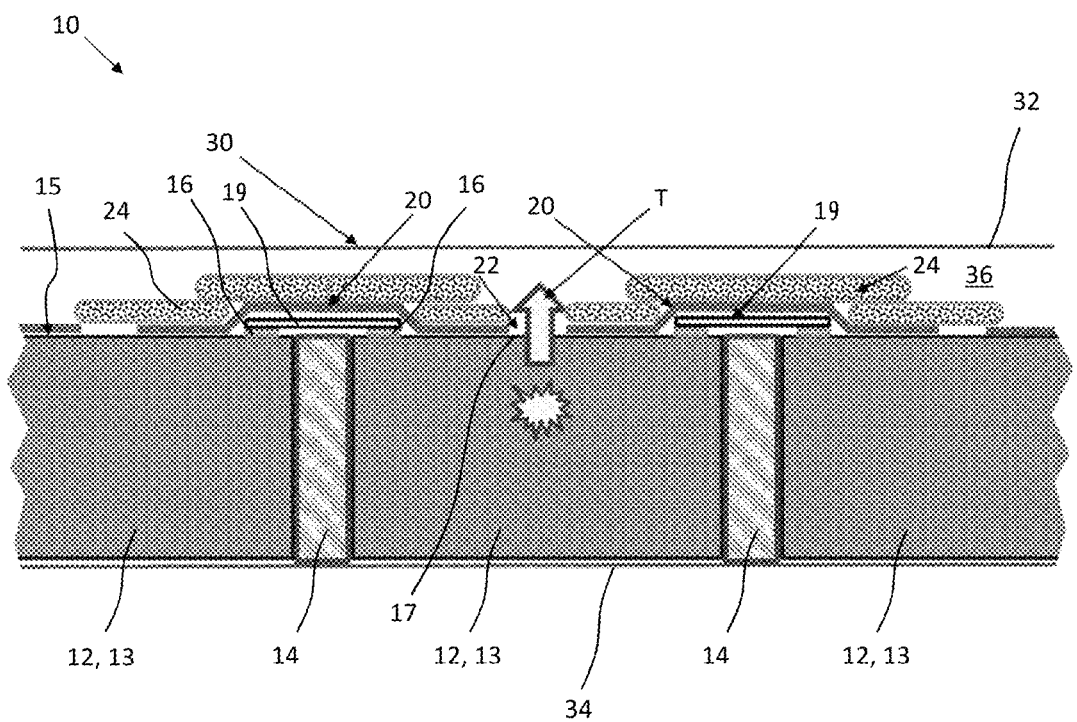
FIG. 1 is a side view illustrating a battery system according to an embodiment.

Reference will now be made, in detail, to embodiments of the present disclosure, examples of which are illustrated in the accompanying drawings. Aspects and features of embodiments of the present disclosure, and implementation methods thereof, will be described with reference to the accompanying drawings. In the drawings, like reference numerals denote like elements, and redundant descriptions are omitted. For better readability, not all elements in the figures are marked with reference signs. Especially in the case of redundant elements, only some of the elements may have reference symbols. In the drawings, the relative sizes of elements, layers, and regions may be exaggerated for clarity.

The present disclosure may be embodied in various different forms and should not be construed as being limited to the illustrated embodiments herein. Rather, these embodiments are provided as examples so that this disclosure will be thorough and complete and will fully convey the aspects and features of the present disclosure to those skilled in the art. Accordingly, processes, elements, and techniques that are not considered necessary for those having ordinary skill in the art to have a complete understanding of the aspects and features of the present disclosure may not be described or may only be briefly described.

As used herein, the term "and/or" includes any and all combinations of one or more of the associated listed items. Further, the use of "may" when describing embodiments of the present disclosure refers to "one or more embodiments of the present disclosure." In the following description of embodiments of the present disclosure, the terms of a singular form may include plural forms unless the context clearly indicates otherwise.

It will be understood that although the terms "first" and "second" are used to describe various elements, these elements should not be limited by these terms. These terms are only used to distinguish one element from another element.

For example, a first element may be named a second element and, similarly, a second element may be named a first element, without departing from the scope of the present disclosure. Expressions such as "at least one of," when preceding a list of elements, modify the entire list of elements and do not modify the individual elements of the list.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

Herein, the terms "top" and "bottom" are defined according to the z-axis. For example, the top cover is positioned at the upper part of the z-axis, whereas the bottom cover is positioned at the lower part thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
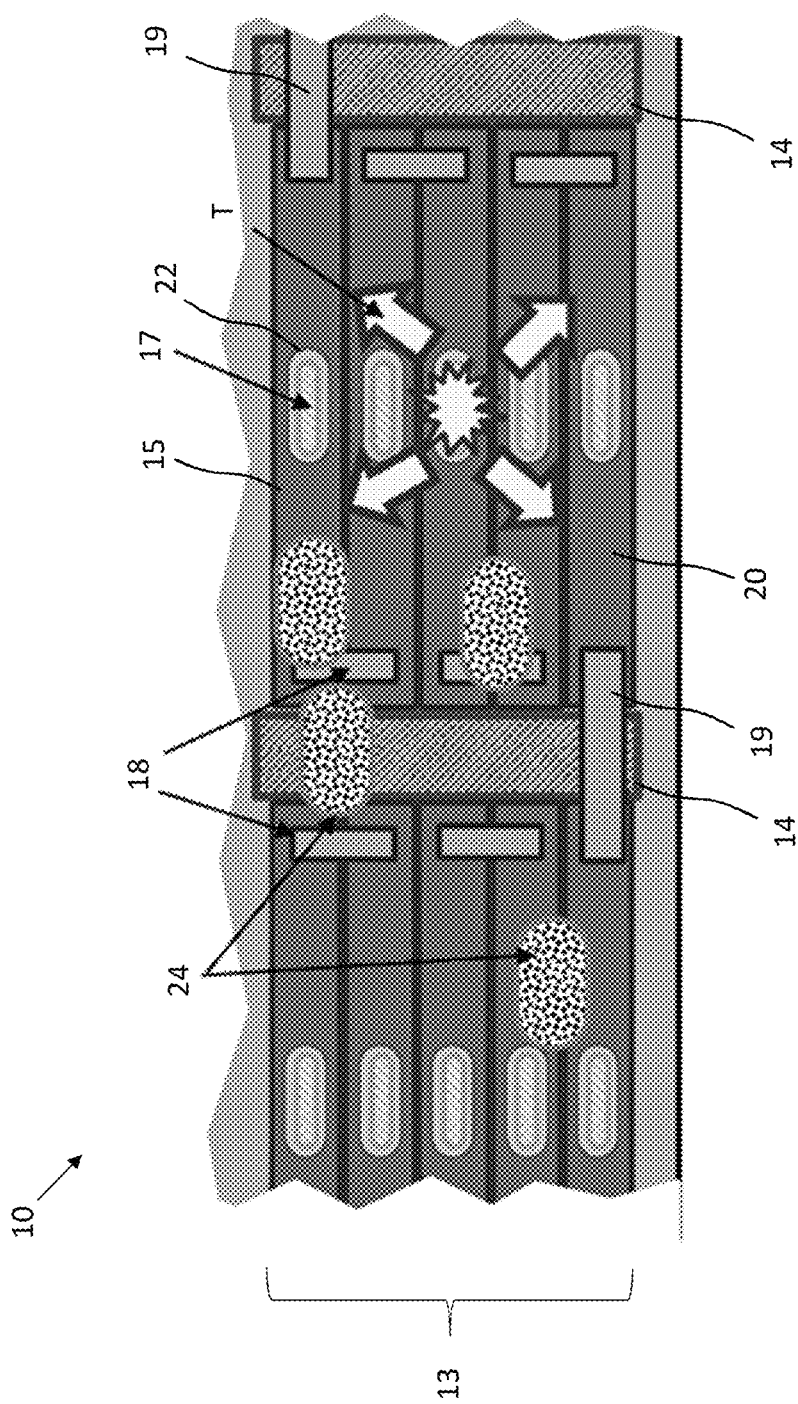
FIG. 2 is a top view illustrating the battery system shown in FIG. 1.

In FIGS. 1 and 2, a battery system 10 for an electric vehicle is shown. The battery system 10 includes a plurality of battery cells 12, and a plurality of battery cells 12 are arranged in a row to form a battery module 13. Neighboring (or adjacent) battery modules 13 are separated from one another by crossbeams 14. The battery system 10 further includes a battery housing 30 including a top cover 32 and a bottom cover 34 enclosing the plurality of battery cells 12. The battery housing may further include side covers at the left and right ends in FIG. 1. The battery cells 12 are arranged inside battery housing 30 such that a hollow space 36 is provided between the battery cells 12 and the top cover 32.

Each battery cell 12 includes two electrode terminals 16, which are connected to electrodes of (e.g., inside) the respective battery cell 12. The battery cells 12 are interconnected with one another via busbars (e.g., first busbars) 18, which provide electrical connection between the electrode terminals 16 of two neighboring battery cells 12. For example, the battery cells 12 are interconnected with one another in series via the busbars 18 within the modules 13. Furthermore, the modules 13, and therefore their battery cells 12, are interconnected with one another in series via busbars (e.g., second busbars) 19 extending between neighboring modules 13 (see, e.g., FIG. 2). The electrode terminals 16 and the busbars 18, 19 are arranged at a venting side 15 (e.g., on or over a venting side 15) of the battery cells 12, which in the illustrated embodiment is the upper side of the battery cells 12 facing the top cover 32. Each of the battery cells 12 includes a venting exit 17 at the venting side 15 configured to allow a venting stream T having venting products 24 produced during an abnormal operation condition, also known as a thermal runaway or a thermal event, to be released from the battery cells 12 if a certain overpressure and/or a certain temperature inside affected battery cells 12 is exceeded.

The battery system 10 further includes an electrically and thermally insulating cover element 20 covering the venting side 15 of the plurality of battery cells 12, including the electrode terminals 16 and the busbars 18, 19. The cover element 20 has venting openings 22 which are aligned with the venting exits 17 of the battery cells 12 so that the venting products 24 exiting the battery cells 12 during a thermal runaway can pass through the venting exits 17 and the venting openings 22 towards the top cover 32 into the hollow space 36. From the hollow space 36, which may be understood as a venting channel, the venting products may be directed to an exterior of the battery system 10. The cover element 20 is adapted to the contour (e.g., the three-dimensional shape) of the parts it covers, such as the electrode terminals 16 and the busbars 18, 19 (see, e.g., FIG. 2). This allows for reliable shielding of the covered elements from the venting products 24.

The venting products 24, which may include not only hot and toxic venting gas but also conductive solid material like graphite powder or metal fragments, may, at least in part, be deposited onto the plurality of battery cells 12, albeit not directly. Because the battery cells 12 are covered by the cover element 20, the electrode terminals 16 and busbars 18, 19 as well as the complete venting side 15 are shielded from depositing venting products 24 by the cover element 20. As can be seen in FIGS. 1 and 2, the venting products 24 deposit onto the cover element 20 without any contact with the electrode terminals 16 and busbars 18, 19. Because the cover element 20 is electrically and thermally insulating, the operation of the electrode terminals 16, busbars 18, 19, and any further live (e.g., electrically active or conductive) parts underneath the cover element 20 is not impacted. For example, no arcing or short circuits occur due to the conductive solid material of the venting products 24. The cover element 20 and top cover 32 of the battery housing 30, thus, form a venting channel to guide the venting products 24 towards the battery exit without contacting the cells 12 and their live parts.

Figure 3:
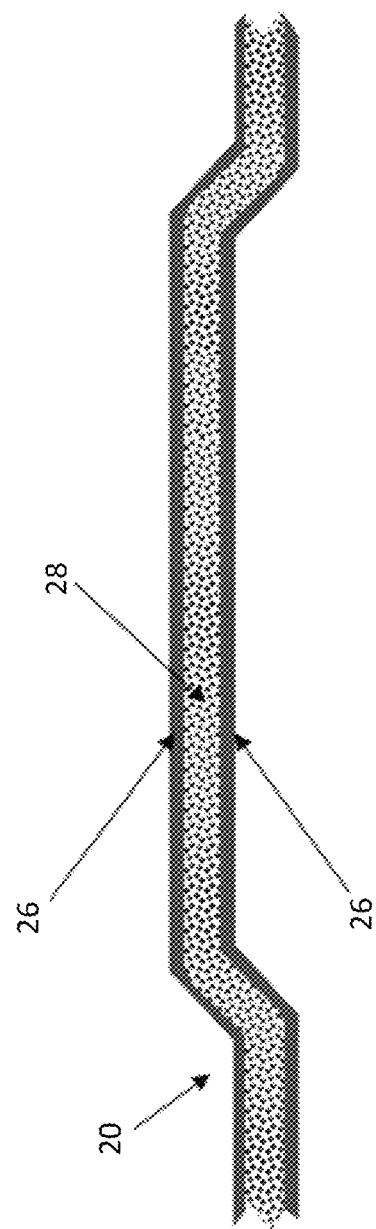
FIG. 3 is a side view illustrating a cover element according to an embodiment.

As can be seen in FIG. 3, the cover element 20 includes two layers 26 of a composite material with a woven fabric and a matrix support material, such as glass fiber mats with resin, and an intermediate layer 28 of an expanded glass granulate as a heat reacting material. The expanded glass granulate reacts to heat occurring during a thermal runaway in that it melts when exposed to the venting products 24 and subsequently hardens so as to form, in combination with the composite material, a mechanically rigid cover plate. The cover element 20, thus, reacts with the venting products 24 in that the intermediate layer 28 melts and combines with the two glass mat layers 26, thereby sealing them. The heat reacting material therefore has a melting point lower than a melting point of the woven fabric. The resin may dissolve during the venting process, making the cover element 20 more flexible. The cover element 20, however, remains dimensionally stable and sealed due to the heat reacting material, which forms a mechanically rigid, heat resistant cover plate with the glass fiber mats to protect remaining components against the hot venting products 24. Thus, the cover element 20 may keep its form that is adapted to the contour (e.g., the three-dimensional shape) of the parts it covers, such as the electrode terminals 16 and the busbars 18, 19.

The cover element 20 may act as a touch protection element. Known touch protection elements can withstand temperatures of up to about 200° C., which is acceptable under normal operating conditions of a battery system. In the case of a thermal runaway, however, the inside of a cell 12 will heat up until the inside pressure exceeds the venting valve limit and a venting stream with temperatures over 1000° C. will exit the cell and most likely flow towards the touch protection element. Standard touch protection elements cannot withstand these temperatures. As a touch protection element, materials that can withstand temperatures up to 1200° C., such as Mica (flat plates), or molded cast with fiber shred may be used. However, these materials will not maintain their shape when exposed to the venting products. In the cover element 20 according to embodiments of the present disclosure, which includes a sandwich of glass mat with resin or other matrix support material and a granulate, the cover element 20 as explained above remains mechanically stable (e.g., mechanically in shape).

In the battery system according to embodiments of the present disclosure, the venting gas and dust is guided within the hollow space between the cover element and a battery cover, thereby preventing the remaining cells or cell stacks from being polluted by the venting products, including dust and graphite particles. The cover element keeps the dust, graphite, and metallic parts away from live parts of the battery, such as the electrode terminals and the busbars, so that arcing and short circuits are prevented. The cover element also remains electrically insulating and sufficiently thermally insulating in the z-direction at elevated temperatures. In addition, the cover element may be formed as a sandwich construction including two glass mats, and an intermediate heat reactant layer may act as a touch protection element for a battery pack. The two glass mats withstand the hot venting products during a thermal runaway while the heat reacting material forms a filler between the glass mats and is positioned for fire protection. The melting filler forms, with the glass mats, a steady heat resistant cover plate. In addition, thermal separation of the remaining cell stacks is provided by the cover element so that thermal propagation is slowed down and the risk of the complete battery pack burning is reduced.

SOME REFERENCE SIGNS 10 battery system
12 battery cells
13 modules
14 crossbeams
15 venting side
16 electrode terminals
17 venting exits
18 busbars/connecting means
20 cover element
22 venting openings
24 venting products
26 layers of composite material
27 resin
28 intermediate layer
30 battery housing
32 top cover
34 bottom cover
36 hollow space
T venting stream

The invention claimed is:

1. A battery system for an electric vehicle, the battery system comprising:
a plurality of battery cells arranged in a plurality of rows, each of the battery cells comprising electrode terminals and having a venting exit;
a first busbar interconnecting adjacent ones of the battery cells in a first one of the rows by contacting the electrode terminals;
a second busbar interconnecting one of the battery cells in the first one of the rows and one of the battery cells in a second one of the rows;
a battery housing enclosing the battery cells, the battery housing comprising a top cover continuously extending over the venting exits of the battery cells; and
an electrically and thermally insulating cover element covering the electrode terminals, the first busbar, and the second busbar and having a plurality of venting openings respectively aligned with the venting exits of the battery cells such that the electrode terminals, the first busbar, and the second busbar are shielded from venting products exiting the venting exit of one or more of the battery cells towards the battery housing during a thermal runaway,
wherein the cover element is between the battery cells and the top cover, and
wherein the first busbar and the second busbar are between the electrode terminals and the cover element.

2. The battery system of claim 1, wherein the cover element is adapted to a contour of the electrode terminals, the first busbar, and the second busbar such that a portion of the cover element on the battery cells is farther from the top cover than a portion of the cover element on the electrode terminals, the first busbar, and the second busbar is.

3. The battery system of claim 1, wherein the cover element fully covers a venting side of the battery cells at where the venting exits are arranged, and
wherein the electrode terminals, the first busbar, and the second busbar are on the venting side.

4. The battery system of claim 1, wherein the venting openings extend through the cover element.

5. The battery system of claim 4, wherein the cover element comprises venting valves or burst membranes configured to open under the pressure of the venting products in the venting openings.

6. The battery system of claim 1, wherein the cover element is configured to resist temperatures of at least 1000° C.

7. The battery system of claim 6, wherein the cover element is configured to resist temperatures of up to 1200° C.

8. The battery system of claim 1, wherein the cover element comprises a composite material with a woven fabric and a matrix support material.

9. The battery system of claim 8, wherein the woven fabric comprises glass and/or basalt fibers.

10. The battery system of claim 8, wherein the cover element further comprises a heat reacting material configured to melt when exposed to the venting products and to subsequently harden so as to form, in combination with the composite material, a mechanically rigid cover plate.

11. The battery system of claim 10, wherein the heat reacting material has a melting point lower than a melting point of the woven fabric.

12. The battery system of claim 10, wherein the heat reacting material comprises a glass granulate.

13. The battery system of claim 10, wherein the cover element comprises a plurality of layers of the composite material, and
wherein the heat reacting material is an intermediate layer between the layers of the composite material.

14. An electric vehicle comprising the battery system of claim 1.

* * * * *